(12) United States Patent
Miyake et al.

(10) Patent No.: US 6,295,884 B1
(45) Date of Patent: Oct. 2, 2001

(54) CONTROL METHOD AND CONTROL APPARATUS OF GEAR TRANSMISSION

(75) Inventors: Tatsuhiro Miyake, Kariya; Takeshige Miyazaki, Nishio, both of (JP)

(73) Assignee: Aisin Ai Co., Ltd., Nishio (JP)

( * ) Notice: Subject to any disclaimer, the term of this patent is extended or adjusted under 35 U.S.C. 154(b) by 0 days.

(21) Appl. No.: 09/410,032

(22) Filed: Oct. 1, 1999

(30) Foreign Application Priority Data

Oct. 29, 1998 (JP) .................................................. 10-308967

(51) Int. Cl.$^7$ ...................................................... F16H 59/18
(52) U.S. Cl. .............................................. 74/335; 477/121
(58) Field of Search .............................. 74/335; 477/122, 477/123, 124, 121

(56) References Cited

U.S. PATENT DOCUMENTS

| 4,616,521 | * | 10/1986 | Akashi et al. | .......................... 74/335 |
| 4,638,690 | * | 1/1987 | Hattori et al. | ...................... 74/335 X |
| 4,911,031 | * | 3/1990 | Yoshimura et al. | .................... 74/335 |
| 5,860,891 | * | 1/1999 | Bäuerle | .................................. 477/48 |
| 5,961,420 | * | 10/1999 | Darnell | ................................ 477/120 |

FOREIGN PATENT DOCUMENTS 2-31072 * 2/1990 (JP) ...................................... 477/122

\* cited by examiner

*Primary Examiner*—Charles A Marmor
*Assistant Examiner*—Ankur Parekh
(74) *Attorney, Agent, or Firm*—Burns, Doane, Swecker & Mathis, LLP

(57) ABSTRACT

An automatic speed-change control and an method speed-change control apparatus of an actuator which automatically drives a speed-change mechanism in a manual gear transmission of an automobile, includes an operating mechanism for controlling the operation of the actuators, a detecting mechanism for judging a speed-change timing and detecting the degree of accelerator depression, a calculating mechanism for calculating an operating factor corresponding to the degree of accelerator depression detected by the detecting mechanism to set a drive amount to the actuator so that the actuator operates by the calculated operate factor, and a command mechanism for supplying the drive amount to the actuator calculated by the calculating means and giving an operating command to the actuator.

3 Claims, 4 Drawing Sheets

CONTROL METHOD AND CONTROL APPARATUS OF GEAR TRANSMISSION

BACKGROUND OF THE INVENTION

1. Field of the Invention

This invention relates to an automatic speed-change control method and an automatic speed-change control apparatus of an actuator which automatically drives a mechanism such as a clutch etc. for changing the combination of meshing or engaging gears of a gear train for speed-change in a manual gear transmission of an automobile.

2. Description of the Related Art

A manual gear transmission of an automobile is basically provided with a gear train for speed-change, a change or switch mechanism for changing or switching a combination of the gear train, and an operating means for operating the change mechanism. For example, in the manual gear transmission in which the gear train for speed-change is mounted on a plurality of shafts in a meshed condition, the combination of gears is changed by shifting and selecting a synchromesh mechanism, which is one kind of clutch mechanism, by the operating means. Thus, rotating power from an engine is outputted after the speed-change.

A manual gear transmission has been developed involving an automatically operated type gear transmission in which a hydraulic actuator which can be controlled electrically or an electrical actuator for operating the clutch mechanism is provided in the operating means to be controlled by a command of ECU (Electronic Control Unit). In such automatically operated type manual gear transmission, the speed-change is performed in view of the durability of the synchromesh mechanism, and a reduction of the vehicle shock and noise.

That is, in the synchromesh-type gear transmission, there are for example four areas which include a shift-draw-out area to draw out a shift-select shaft from a shift fork, a select area to select the shift fork, a synchronize area where a synchronizer ring frictionally contacts with the gear, and a push-apart area where the sleeve meshes with the gear. As the time of the synchronize area is set shorter, the durability of the sleeve, the synchronizer ring and the cone etc. deteriorates, and as a shift shock speed at the push-apart area is set larger, vehicle shock and noise become remarkable.

In view of the above, in the manual gear transmission which has adopted the automatically operated method, an actuating amount or a driving amount of the hydraulic actuator or electrical actuator which operates the shift fork (a fluid speed or pressure in the hydraulic actuator, and a drive voltage or drive current in the electric actuator) is selected to be small so that the stroke speed of the shift fork is reduced, thereby setting the speed-change time to be relatively longer. In this way, the durability of the speed-change mechanism is increased, and the vehicle shock and the noise are reduced or attenuated. In other words, in the known manual gear transmission, the actuator is operated by seriously taking into account the durability increase of the speed-change mechanism and the reduction of the vehicle shock and noise.

However, in the synchromesh type gear transmission for example, the synchromesh mechanism which has been conventionally handled manually by a driver is automatically operated by an actuator for effecting the automatic speed-change, so the synchromesh transmission needs to be operated by an actuator in a manner equivalent to the manual operation. That is, the driver expects, when he or she kicks down or presses the accelerate pedal, that the actuator performs the quick speed-change to increase the vehicle speed in a short time. The above operation of the actuator which takes the mechanism durability and vehicle shock/noise reduction serious and ignores the speed-change timing is contrary to the driver's requirements for a speed-change time. Thus, the driver receives a strange feeling due to the delay in response of the speed-change mechanism.

SUMMARY OF THE INVENTION

The present invention is made in view of the above mentioned circumstances, and therefor has a purpose or object to provide the automatic speed-change control method and the automatic speed-change control apparatus of the manually operated type gear transmission in which the driver's requirements for speed-change timing, increased durability of the speed-change mechanism, and attenuation of the vehicle shock and noise are all considered.

The automatic speed-change control method of the present invention for the manual gear transmission includes a gear train for speed-change, a clutch mechanism for performing the speed-change by changing the meshing combination of the gear train, an actuator for driving the clutch mechanism, and an operating means for controlling the operation of the actuator. The control method involves steps of 1) judging a speed-change timing based on an operation of the operating means, 2) detecting an degree of accelerator depression when the speed-change timing is judged in said judge step, and 3) setting an operating factor of the actuator corresponding to the degree of accelerator depression detected in the detecting step.

According to the automatic speed-change control apparatus of the present invention for the manual gear transmission comprising a gear train for speed-change, a clutch mechanism for changing a meshing combination of the gear train, an actuator for driving the actuator, and an operating means for controlling an operation of the actuator. The operating means includes 1) a detect means for detecting a speed-change timing and detecting the degree of accelerator depression, 2) a calculate means for calculating an operating factor corresponding to the degree of accelerator depression detected by said detect means, to set a drive amount to the actuator so that the actuator operates by the calculated operating factor, and 3) a command means for supplying the drive amount to the actuator calculated by said calculate means and giving an operating command to the actuator.

In controlling the actuator of the manual gear transmission by the control method and the control apparatus according to the present invention, as the degree of accelerator depression in speed-changing becomes larger, the actuator shifts in higher speed, or the actuator completes the operation in shorter time. Thus, when the accelerator pedal is deeply kicked down by the driver, the actuator is controlled automatically by giving the preference to the speed-change time to meet the driver's requirement for the speed-change time. On the other hand, when the kick-down amount of the accelerator pedal is small and accordingly the opened degree of the throttle is small, the actuator is operated in low speed or the actuator completes the operation in a long time. Thus, the speed-change by giving the preference to a prevention of bad influence to the durability of the clutch mechanism and the attenuation of the vehicle shock and the noise is performed.

According to the automatic speed-change control method and the automatic speed-change control apparatus of the present invention, the operating speed of the actuator for the automatically operated actuator can be set in higher speed or lower speed, or the operating time of the actuator can be extended or shortened according to the driver's speed-change operation. As a result, one of the speed-change of the manual gear transmission which satisfies the driver's requirement for the speed-change operation, and the speed-change which prevents the influence to the durability of the clutch mechanism and attenuates the vehicle shock and the noise, can be selected.

In the manual gear transmission to which the automatic speed-change control method and the automatic speed-change control apparatus of the present invention are applied, the actuator can be comprised of a hydraulic actuator such as a linear actuator or an electrical actuator such as a motor, and is disposed in the shift-select shaft or the shift fork. One actuator is sufficient for the shift-select shaft when the actuator is disposed in the shift-select shaft. A single actuator is sufficiently provided when the actuator is disposed in the shift-select shaft. In case that the actuator(s) is (are) disposed in the shift fork, plural actuators can be disposed corresponding to each shift-select shaft when there are plural shift forks, or one actuator can be disposed if another change means corresponding to the shift-select lever is provided.

In the automatic speed-change control method and the automatic speed-change control apparatus of the present invention, the speed-change timing is judged by detecting a driver's handling to a speed-change lever, or a speed-change switch, or a speed-change command based on a speed-change map of the ECU.

In the automatic speed-change control method and the automatic speed-change control apparatus of the present invention, the operate means can be comprised of a ECU which controls the actuator, and an operate lever of electrical switch type, and the like. The ECU (especially the calculate means thereof) can calculate the speed-change time and the operating speed of the actuator corresponding to the degree of accelerator depression, by utilizing a map in which a relationship between the degree of accelerator depression and the speed-change time or the speed-change speed is dated, or a map in which a relationship between the degree of accelerator depression and the actuator operating speed is dated. The operating lever can be one of an H-shaped type lever, an accelerate/decelerate type linear lever or a switch provided on a steering wheel and the like.

In the automatic speed-change control method and the automatic speed-change control apparatus of the present invention, when the ECU sets the speed-change time, the actuator can operate by a constant speed over a full stroke. However, the operating speed of the actuator can be changed (increased or decreased) in the course of the speed-change so that one speed-change is securely completed during this speed-change time, based on position information by a position sensor to detect an operating position of the actuator. On the other hand, when the ECU sets the speed-change speed, the speed-change is performed so that this speed-change speed is always maintained.

PREFERRED EMBODIMENT OF THE INVENTION

Embodiments of the present invention will be explained with reference to attached drawings, but it is noted that the present invention is by no means limited to these embodiments, but can include various modifications or deformations within a sprit thereof.

Figure 1:
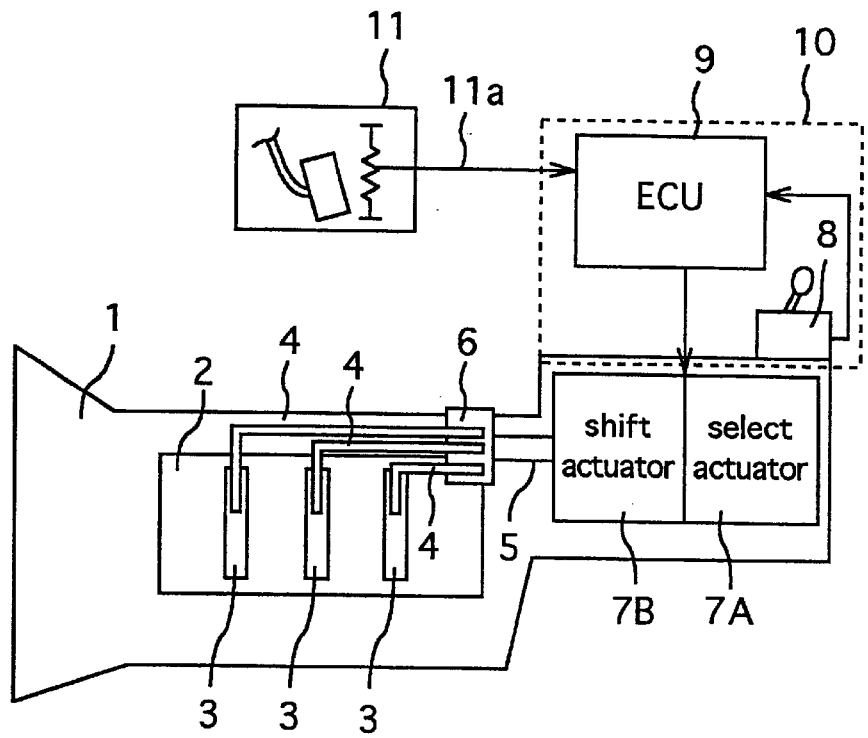
FIG. 1 shows a schematic view which shows one embodiment of an automatic speed-change control apparatus of a manual gear transmission according to the present invention.

As shown in FIG. 1, a manually operated gear transmission of an automobile is provided with a gear train 2 mounted on a transmission body 1, and this gear train 2 includes a plurality of clutch mechanisms 3 as a synchromesh mechanism for changing a meshing combination of the gear train, a drive portion 4, 5, 6, 7A and 7B of the clutch mechanisms 3, and an operating means 10 for operating the actuators 7A and 7B.

Each of the clutch mechanisms 3 is constructed to be shifted in an axial direction of the gear trains 2 by each of several shift forks 4, and a rotary selective type gate member 6 engaged by a tip end of a shift-select shaft 5 is attached at a base end of each shift fork 4. The shift-select shaft 5 is driven in a rotary (select) direction by a rotary type select actuator 7A, and is driven in a shift direction by a linear shift type shift actuator 7B.

Both of the actuators 7A, 7B are electrically driven by the supply of current to the motor so that the actuators 7A, 7B cause the shift-select shaft 5 to perform the select operation and the shift operation, respectively. If the actuators 7A, 7B are driven hydraulically, the shift-select shaft 5 is subjected to the select operation and shift operation by the supply of a current to each of electromagnetic valves which control a pressure or a flow amount of an operating oil in a hydraulic circuit. The actuators 7A, 7B have sensors (not shown) for detecting a shift position and a select position of the shift-select shaft 5, and are operated by an operating means 10 comprised of a handle lever 8 of an electrical switch type and an ECU 9. An accelerator opened degree sensor 11 which detects at least a kick-down angle of a accelerator pedal is connected is connected to the ECU.

Figure 2:
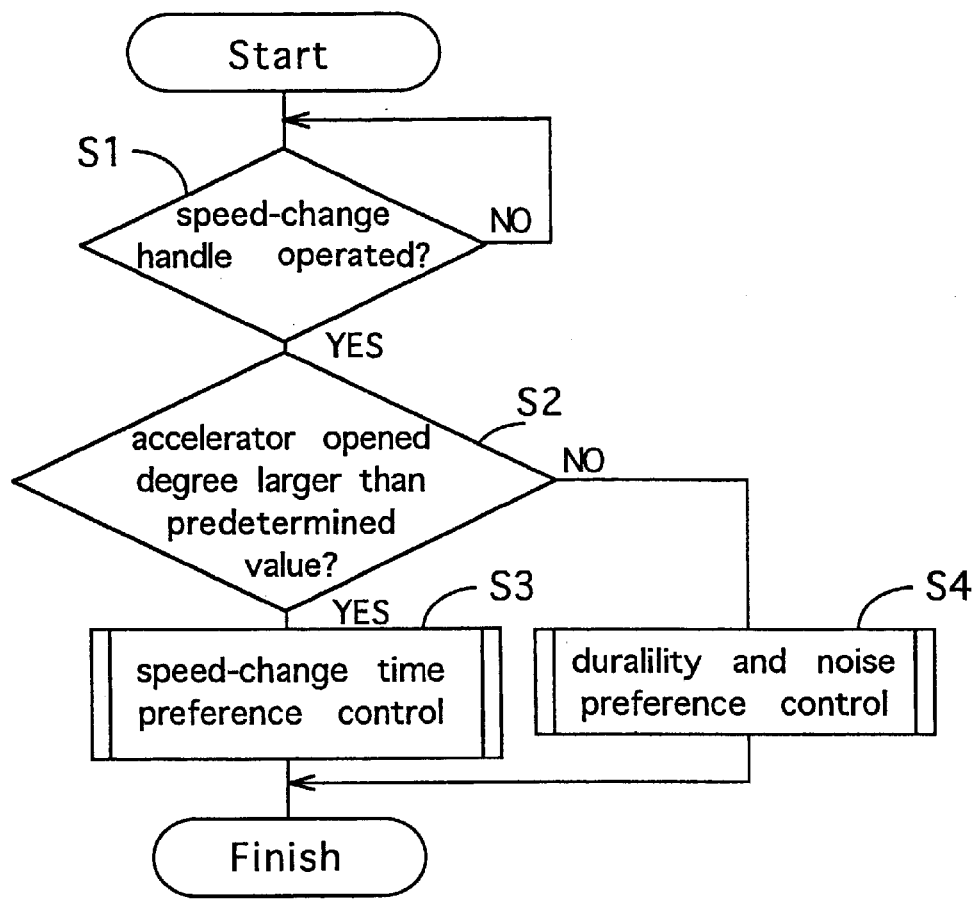
FIG. 2 shows a flow-chart which shows a control method of the above embodiment of FIG. 1.

The operation of the above manual gear transmission is controlled along a flow-chart shown in FIG. 2. This flow-chart is characterized by two kinds of control, i.e. a control which gives preference to the speed-change time (speed-change time preference control) carried out in a step S3, and a control which gives preference to the extension of durability and the reduction of vehicle shock and noise (durability and noise preference control) carried out in a step S4, that can be selectively performed. A sequence of the control is, for example, set in a program assembled into the ECU 9.

In FIG. 2, a presence/absence of the speed-change operation by the driver is judged in step S1, and whether the degree of accelerator depression inputted from an accelerator depression angle sensor 11 as an angle signal 11a is larger than a predetermined value θ or not is judged in step S2. Here, the value θ is determined based on the driver which coincides with the characteristic of the vehicle. In detail, when the handle lever 8 is operated, the ECU 10 determines an operating time in step S1, and takes in the angle signal 11a from the accelerator depression angle sensor 11. Then, when the degree of accelerator depression is judged to be larger than the predetermined value θ in step S2, the speed-change time preference control is performed in step S3. To the contrary, when the degree of accelerator depression is judged to be smaller than the predetermined value θ in the step S2, the durability and noise preference control is performed in the step S4.

Differences between the speed-change time preference control S3 and the durability and noise preference control S4 reside in the length of the speed-change time or the dimension of the speed-change speed. When a value of the angle signal 11a is larger than the predetermined value θ and the speed-change time preference control is performed in step S3, a drive current amount supplied to the electrical actuator 7A, 7B is set larger so that a change of the clutch mechanism 3 is completed in a short time or by a quick speed-change speed. A large amount of drive current shortens the operating time of the shift-select shaft 5, the shift fork 4 and the clutch mechanism 3, which results in the operating time for the speed-change at each area (i.e., the shift draw-out area, the select area, the synchronize area and the push apart area) of the gear transmission being shortened. In this way, the speed-change operation corresponding to the driver's speed change handle can be performed. To the contrary, when a value of the angle signal 11a is smaller than the predetermined value θ and the durability and noise preference control is performed in step S4, a drive current amount supplied to the electrical actuator 7A, 7B is set smaller so that a change of the clutch mechanism 3 is completed over a long time or by a slow speed-change speed.

The drive current amount supplied to the actuators 7A, 7B can be made constant throughout the speed-change operation, but can be varied so that a necessary and suitable amount of the drive current is applied corresponding to the shift draw-out area, the select area, the synchronize area and the push-apart area (for example, the speed-change time is set longer in the synchronize area, and the speed-change speed is set smaller in the push-apart area).

Figure 5:
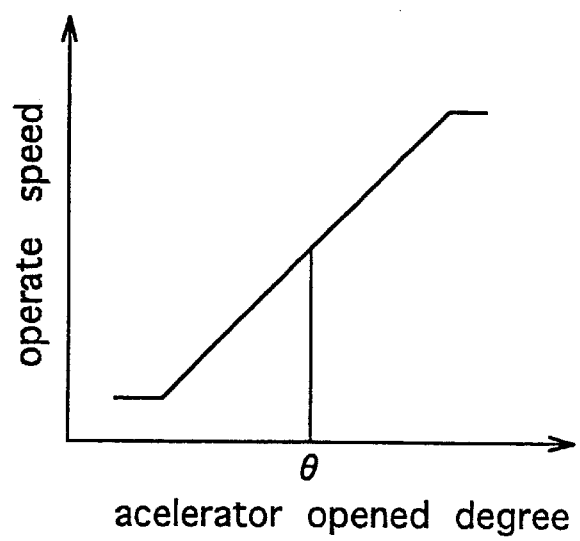
FIG. 5 shows an another example of a map used in a ECU of FIG. 3.
Figure 4:
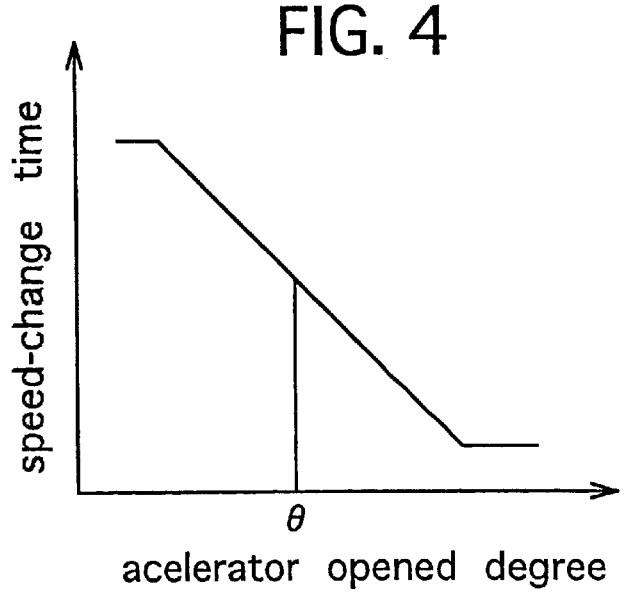
FIG. 4 shows one example of a map used in a ECU of FIG. 3.
Figure 3:
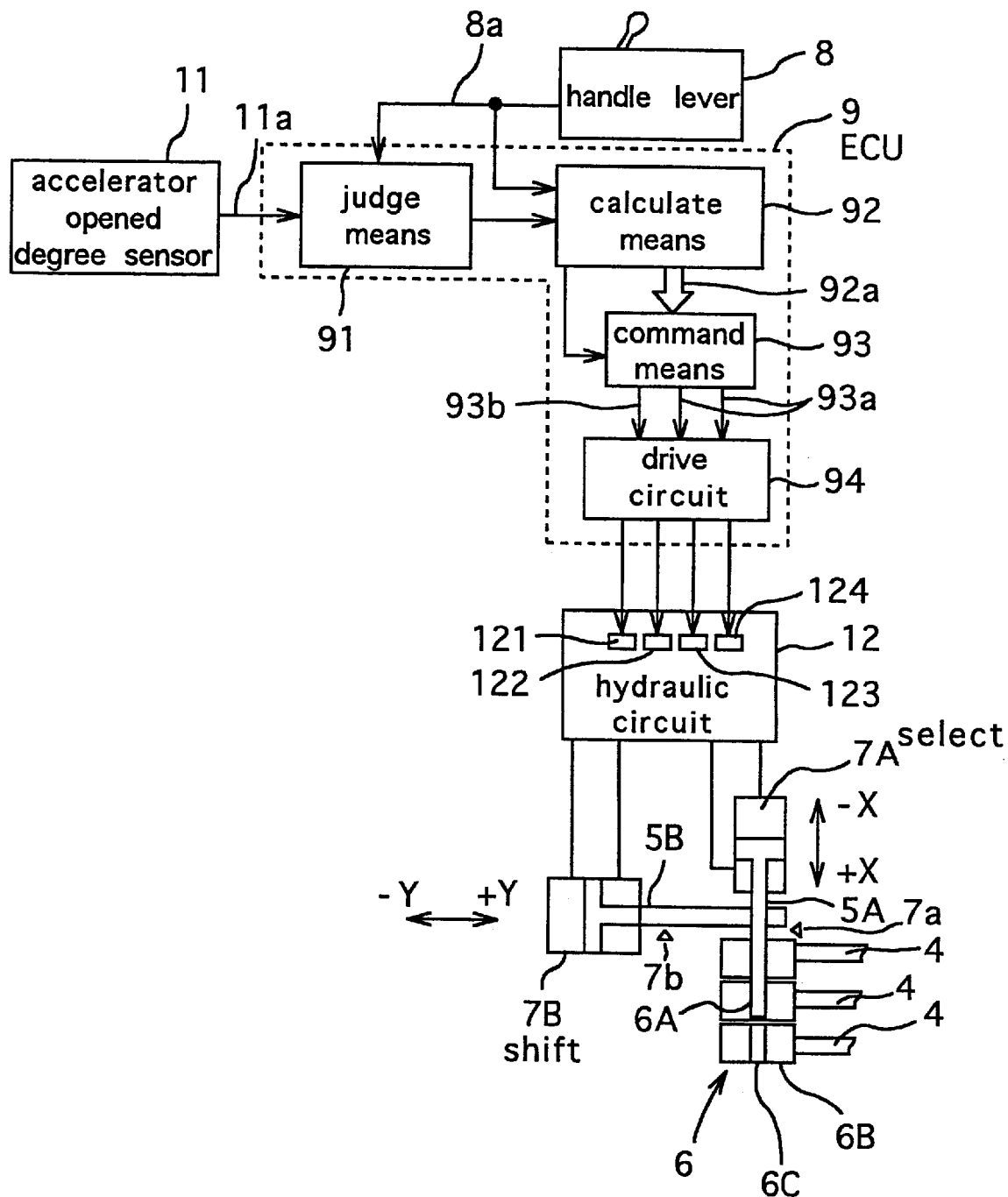
FIG. 3 shows a detail construction view of the automatic speed-change control apparatus of manual the gear transmission of FIG. 1.
Figure 6:
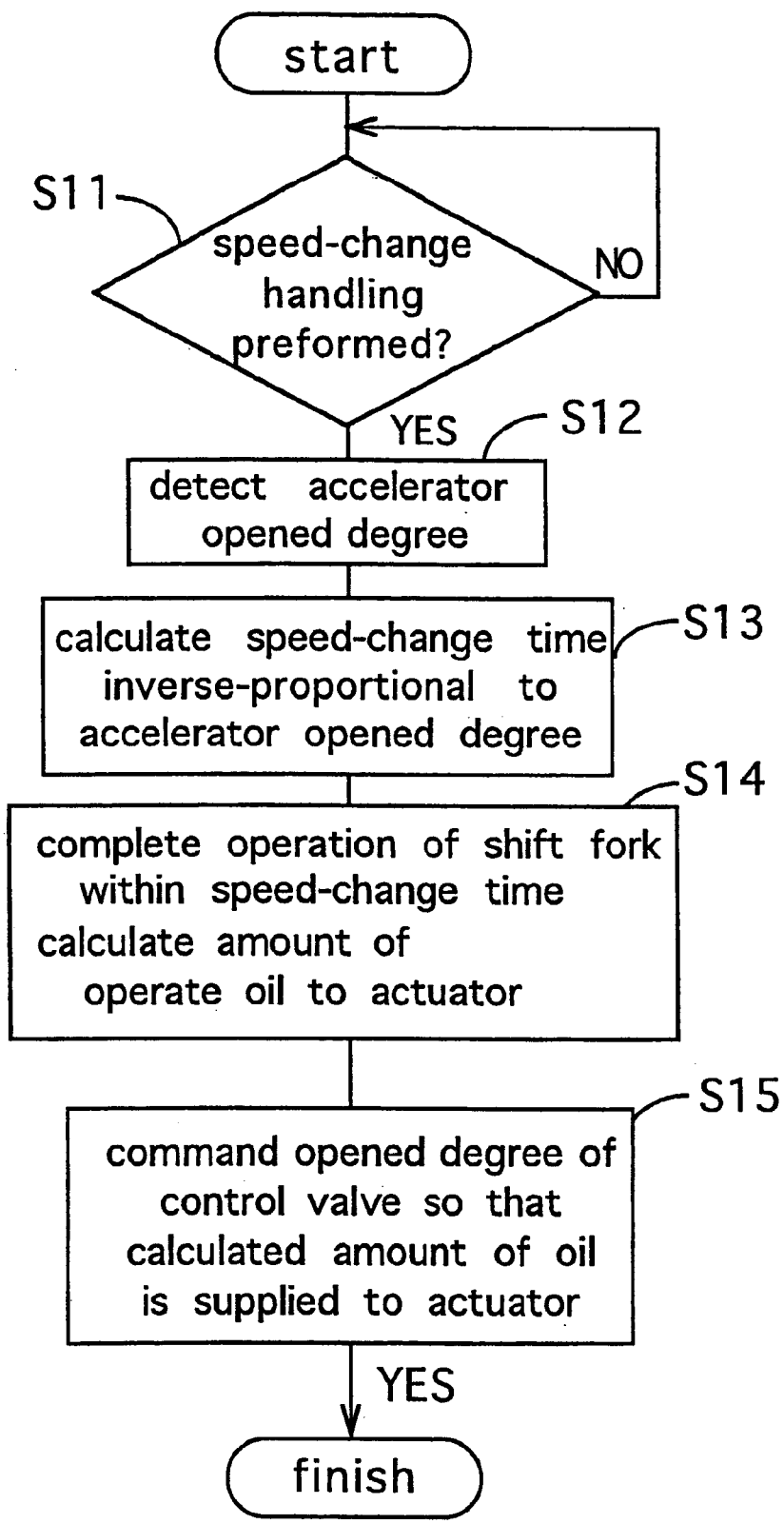
FIG. 6 shows a flow-chart which shows an automatic speed-change control method of the manual gear transmission of FIG. 3.

Next, the details of the automatic speed-change control apparatus of the manual gear transmission of FIG. 1 is shown in FIG. 3, and a control method thereof is show in FIGS. 4 to 6.

In FIG. 3, reference numerals which are same as that of FIG. 1 are added to common elements. The signal 8a from the handle member 8 which means the handle member 8 is handled and the angle signal 11a from the accelerator depression degree sensor 11 are inputted into the ECU 9. The ECU 9, based on the angle signal 11a, controls the operating speed of the shift actuator 7B and the select actuator 7A, via a hydraulic circuit 12 which has an electromagnetic solenoid valve to control the oil pressure and the oil amount.

The ECU 9 includes a judging means 91, a calculating means 92, a command means 93 and a drive means 94, and performs the control so that the degree of accelerator depression and the speed-change time are inversely-proportional (refer to FIG. 4 to be explained later). The judging means 91 takes in the signal 8a inputted from the operate member 8 which means the presence of the operation thereof and the angle signal 11a inputted from the accelerator opened degree sensor 11, to judge the speed-change timing based on the signal 8a and to detect the degree of accelerator depression based on the angle signal 11a. The calculating means 92, based on the map show in FIG. 4, controls the shift actuator 7B and the select actuator 7A. In FIG. 4, the ordinate shows the speed-change time while the abscissa shows the degree of accelerator depression to have an inversely-proportional relationship. That is, as the degree of accelerator depression becomes larger, the speed-change speed becomes shorter.

That is, the calculating means 92 calculates the speed-change time of the shift actuator 7B and the select actuator 7A which is inversely-proportional to the degree of accelerator depression of the accelerator, and sets the supply current amount to each of the solenoids 121 to 124 of the hydraulic circuit 12 so that both of the actuators 7A, 7B operate in the calculated speed-change time. The command means 93 outputs a command current value 93a after converting a command value data 92a of the supplied current amount calculated in the calculating means 92 to an analog signal, and outputs an operation start command 93b based on the signal 8a which means the presence of the lever handling. Finally, the drive means 94, based on the operation start command 93b from the command means 93, supplies a power output corresponding to the command current value 93a to each of the solenoids 121 to 124 of the hydraulic circuit 12.

Each of the solenoids 121 to 124 of the hydraulic circuit 12 controls each of the control valves disposed therein to control the pressure and amount of operating oil to the shift actuator 7B and the select actuator 7A. The pressure of the operating oil to the shift actuator 7B and the select actuator 7A determines the operating direction and the operating pressure thereof, and the amount of operating oil to the actuators 7A, 7B determines the operating speed thereof. For shortening the speed-change time, the ECU 9 supplies current to the solenoid 121 to 124 to make the opened degree of the control valve larger so that a large amount of operating oil is supplied to the shift actuator 7B and the select actuator 7A. For extending the speed-change time, the ECU 9 supplies current to the solenoid 121 to 124 to make the opened degree of the control valve smaller so that a smaller amount of operating oil is supplied to the shift actuator 7B and the select actuator 7A.

As shown in FIG. 3, the shift-select shaft 5 depicted in FIG. 1 to operate the shift fork 4 is comprised of two shafts 5A, 5B which are crossed with each other orthogonally is shown schematically. One shaft 5A is connected to a piston of the select actuator 7A, and other shaft is connected to a piston of the shift actuator 7B.

A gate member 6 is comprised of a slider 6A, and a connector 6B which has an engage groove 6C in which the slider 6A slides in an engaged condition. The connector 6B is connected to a base end of each shift fork 4, and the slider 6A is slid in a +X direction by the shaft 5A. The slider 6A is slid in –X direction by the hydraulic pressure, but can be biased by a spring (not shown). The shift actuator 7B which shifts the shaft SB in ±Y direction is constructed integrally with the slider 6A. According to this construction, the shift actuator 7B shifts in the ±X direction associated with the select operation of the select actuator 7A.

Due to the above construction of the hydraulic circuit 12, the shift actuator 7B, the select actuator 7A, the gate member 6 and the shift forks 4, the connector 6b selected by the shift of the slider 6A by the select actuator 7A shifts the predetermined shift fork in the ±Y direction via the slider 6A, by ±Y direction shift of the shift actuator 7B. In this way, the clutch mechanism 3 (FIG. 1) is operated.

The control method or manner of the above gear transmission will be explained with reference to FIGS. 4 to 6. The flow-chart shown in FIG. 6 corresponds to a program written in the ECU 9. In more detail, the judging means 91 judges whether or not the speed-change handle is performed in step S13, based on the signal from the handle lever 8. When the signal 8a due to the handling of the handle lever 8 is detected, the judging means 91 detects, based on the signal 11a from the accelerator depression angle sensor 11, the degree of accelerator depression in the step S12. Then, the sequence advances to step S13.

In step S13, the calculating means 92 calculates the speed change time which is inversely-proportional to the degree of accelerator depression, based on the map shown in FIG. 4. The speed-change time can be calculated by utilizing a linearity of this map. After the calculating means 92 calculate the speed-change time corresponding to the degree of accelerator depression, the sequence advances to step S14 to calculate the amount of operating fluid to the actuators 7A, 7B so that the shift fork 4 completes the shift thereof in the speed-change time. In step 14, the command means 93 calculates the operating time of the shift actuator 7B and the select actuator 7A, and further calculates the amount of operating oil (flow speed) for such operating speed so that the operating time necessary for operating the actuators 7A, 7B coincides with the calculated speed-change time. The step S14 is performed by the command means 93.

Then, in a step 15, the command means 93 calculates the opened degree of the control valve corresponding to the operating oil amount obtained in step S14, and calculates the current amount to the solenoids 121 to 124 to open the control valve of the hydraulic circuit 12 to such opened degree. Briefly speaking, the command means 93 calculates the current amount to the solenoids which corresponds to the speed-change time. The relationship between the speed-change time and the current amount can be calculated in advance from an experience law, the current amount corresponding to the degree of accelerator depression can be obtained by the map of FIG. 4 after all. Step S15 is then performed by the command means 93.

In this way, when the driver performs the speed-change handling, the shift actuator 7B and the select actuator 7A can be operated in one of the operating speed which responds to the driver's requirement and does not cause the driver a strange feeling, or in the operating speed giving preference to the durability of the clutch mechanism 3 and the like, corresponding to the degree of accelerator depression.

That is, as the degree of accelerator depression in the speed-change becomes larger, the operating speed of the shift actuator 7B and the select actuator 7A is set faster and the speed-change time is set shorter, so that the clutch mechanism 3 operates to satisfy the driver's requirement for the speed-change. To the contrary, as the degree of accelerator depression in the speed-change becomes smaller, the operating speed of the select actuator 7A and the shift actuator 7B is set slower and the speed-change time is set longer, so that the clutch mechanism 3 operates to give preference to the durability of the clutch mechanism 3, and the attenuation of the vehicle shock and noise.

Here, in the control based on the operating time, the ECU 9 can judge whether or not the speed-change is performed in the speed-change time by the signal from sensors 7A, 7B, for example, for detecting the operating positions of the shift actuator 7B and the select actuator 7A. When the ECU 9 judges that the speed-change has not been completed in the speed-change time, it makes the operating speed of the select actuator 7A or the shift actuator 7B larger, but when the ECU 9 judges that the speed-change has been completed in the speed-change time, it makes the operate speed of the select actuator 7A or the shift actuator 7B smaller.

In addition, different from the above speed-change based on the speed-change time, the ECU 9 can perform the speed-change operation which gives preference to the speed-change speed. In this case, the calculating means 92 in the ECU 9 uses a map shown in FIG. 5, in which the ordinate shows the operating speed and the abscissa shows the degree of accelerator depression. As is apparent from FIG. 5, as the degree of accelerator depression becomes larger, the operating speed becomes faster to have a proportional relationship. According to this map, the operating speed proportional to the degree of accelerator depression is read out, and as the kick-down angle of the accelerator pedal becomes larger, the faster operating speed is set. Thus, the select actuator 7A and the shift actuator 7B are operated to maintain the set operating speed. Here, the judging means 91 and the command means 93 operate in the same manner mentioned above.

What is claimed is:

1. A synchromesh-type transmission comprising a gear train for speed-change, a synchromesh mechanism for changing a combination of gears in the gear train, an actuator for actuating the synchromesh mechanism, and a control apparatus for controlling operation of the actuator, said control apparatus including:

judging means for judging a shifting of a shifting lever and for detecting an accelerator opened degree;

calculating means for calculating a shifting time of the actuator corresponding to the detected accelerator opened degree based on a predetermined map which sets forth a relationship between the accelerator opened degree and the shifting time of the actuator so that as the accelerator opened degree becomes smaller the shifting time becomes longer and so that as the accelerator opened degree becomes larger the shifting time becomes shorter;

command means for determining an operating speed of the actuator which will complete a speed-change within the calculated shifting time and for commanding the actuator based on the determined operating speed.

2. The synchromesh-type transmission according to the claim 1, wherein the actuator is a hydraulic cylinder, and said command means determines a pressure and a flowing amount of an oil of the hydraulic cylinder for operating the actuator at the operating speed.

3. The synchromesh-type transmission according to the claim 1, wherein the actuator is an electric motor, and said command means determines a flowing current amount of the electric motor for operating the actuator at the operating speed.

* * * * *